US011012863B1

(12) United States Patent
Marupaduga et al.

(10) Patent No.: US 11,012,863 B1
(45) Date of Patent: May 18, 2021

(54) METHOD AND SYSTEM FOR CONFIGURATION OF CARRIER-AGGREGATION SERVICE

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 22 days.

(21) Appl. No.: 16/405,306

(22) Filed: May 7, 2019

(51) Int. Cl.
*H04W 16/14* (2009.01)
*H04W 16/18* (2009.01)
*H04L 5/00* (2006.01)
*H04W 36/24* (2009.01)
*H04W 48/12* (2009.01)
*H04W 76/15* (2018.01)
*H04W 76/27* (2018.01)

(52) U.S. Cl.
CPC ............ *H04W 16/14* (2013.01); *H04L 5/001* (2013.01); *H04W 16/18* (2013.01); *H04W 36/24* (2013.01); *H04W 48/12* (2013.01); *H04W 76/15* (2018.02); *H04W 76/27* (2018.02)

(58) Field of Classification Search
None
See application file for complete search history.

(56) References Cited

U.S. PATENT DOCUMENTS

| 7,349,699 | B1 | 3/2008 | Kelly et al. | |
| 9,699,699 | B1* | 7/2017 | Oroskar | H04W 36/24 |
| 10,123,339 | B1 | 11/2018 | Bertz et al. | |
| 2009/0310563 | A1* | 12/2009 | Chou | H04W 36/12 370/331 |
| 2015/0043472 | A1* | 2/2015 | Seo | H04W 36/0077 370/329 |
| 2015/0208314 | A1* | 7/2015 | Lorca Hernando | H04W 36/32 455/441 |
| 2016/0112918 | A1* | 4/2016 | Wen | H04L 5/001 455/442 |

(Continued)

OTHER PUBLICATIONS

A. Roessler et al., "LTE-Advanced (3GPP Rel. 12) Technology Introduction White Paper", Rohde & Schwarz, 6.2014-1MA252 2E. (Year: 2014).*

*Primary Examiner* — Faruk Hamza
*Assistant Examiner* — Cassandra L Decker

(57) ABSTRACT

When a first base station is serving a UE with carrier-aggregation on a combination of carriers including a first carrier as PCC of the carrier-aggregation service and a second carrier as an SCC of the carrier-aggregation service, the first base station could predict that the UE will hand over from being connected with the first base station to being connected with an adjacent second base station on the second carrier. In response to this prediction, the first base station could then reconfigure the UE's carrier aggregation service by swapping the UE's PCC and SCC so that the second carrier would become the PCC of the carrier-aggregation service and the first carrier would become an SCC of the carrier-aggregation service. This reconfiguration of the UE's carrier-aggregation service could thereby facilitate carrier continuity as the UE engages in the predicted handover.

20 Claims, 4 Drawing Sheets

(56) References Cited

U.S. PATENT DOCUMENTS

| | | | |
|---|---|---|---|
| 2017/0280468 A1* | 9/2017 | Harada | H04L 5/0048 |
| 2018/0213452 A1* | 7/2018 | Kim | H04L 5/0053 |
| 2018/0255497 A1* | 9/2018 | Furuichi | H04W 36/32 |
| 2018/0295544 A1* | 10/2018 | Feng | H04W 36/30 |
| 2019/0007875 A1* | 1/2019 | Gheorghiu | H04W 24/10 |
| 2020/0045762 A1* | 2/2020 | Raghuram | H04W 76/16 |

\* cited by examiner

METHOD AND SYSTEM FOR CONFIGURATION OF CARRIER-AGGREGATION SERVICE

BACKGROUND

A cellular wireless network typically includes a number of base stations that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated) can operate. Each base station could be coupled with a core network that provides connectivity with various application servers and/or transport networks, such as the public switched telephone network (PSTN) and/or the Internet for instance. With this arrangement, a UE within coverage of the cellular network could engage in air interface communication with a base station and could thereby communicate via the base station with various application servers and other entities.

Such a network could operate in accordance with a particular radio access technology (RAT), with communications from the base stations to UEs defining a downlink or forward link and communications from the UEs to the base stations defining an uplink or reverse link.

In accordance with the RAT, each base station could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the base stations and UEs.

Over the years, the industry has embraced various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

OVERVIEW

When a UE enters into coverage of an example network, the UE could detect threshold strong coverage of a base station (e.g., a threshold strong reference signal broadcast by the base station) on a particular carrier and could then engage in random-access and Radio Resource Control (RRC) signaling to establish an RRC connection through which the base station will serve the UE on that carrier.

Further, if the UE is not already registered for service with the core network, the UE could transmit to the base station an attach request, which the base station could forward to a core-network controller for processing. And the core-network controller could then coordinate setup for the UE of one or more bearers extending between the base station and a core-network gateway that provides transport-network connectivity, with the base station further setting up corresponding data radio bearers extending over the air between the base station and the UE.

Once the UE is so connected and registered, the base station could then serve the UE in a connected mode on the carrier, managing downlink air-interface communication of packet data to the UE and uplink air-interface communication of packet data from the UE.

For example, when packet data for the UE arrives at the core network from a transport network, the data could flow to the UE's serving base station, and the base station could then schedule and provide transmission of that data to the UE on particular downlink air-interface resources of the carrier. Likewise, when the UE has data to transmit on the transport network, the UE could transmit a scheduling request to the base station, the base station could responsively schedule transmission of that data from the UE on particular uplink air-interface resources of the carrier, and the UE could accordingly transmit the data to the base station for forwarding through the core network to the transport network.

While so served by a base station, the UE may also regularly evaluate coverage strength from that base station and perhaps coverage strength from one or more adjacent base stations. And when the UE discovers adjacent coverage that is threshold stronger than coverage of the serving base station, the UE may report that detected coverage to the serving base station. In response to this measurement report, the base station may then engage in a process to hand over the UE to be served by the adjacent base station. For instance, the base station could engage in signaling to prepare the adjacent base station to serve the UE and could then direct the UE to transition to be served by the adjacent base station.

In addition, once a UE connects with and is served by a base station on a given carrier, the base station may add one or more additional carriers to the UE's service and may serve the UE with carrier-aggregation service on a combination of the carriers. Implementation of carrier-aggregation service can help to provide increased peak data rate, as the combined bandwidth of the aggregated carriers could provide greater air-interface capacity than any single one of the carriers would. Therefore, carrier-aggregation service could be desirable for a UE that is or will be engaged in high-throughput communication.

In a typical carrier-aggregation implementation, each carrier on which the UE is served is considered a component carrier. One component carrier on which the UE is served, typically the carrier on which the UE initially connects with the base station, would be deemed a primary carrier or primary component carrier (PCC) of the carrier-aggregation service. And each other carrier on which the UE is served would be deemed a secondary carrier or secondary component carrier (SCC) of the carrier-aggregation service.

One of the key distinctions between the PCC on which a UE is served and each of one of more SCCs on which the UE is served is that the UE and base station treat the PCC as the carrier on which the UE is connected with the base station, whereas each SCC is added merely for purposes of increasing the bandwidth available for carrying data communication between the base station and the UE.

Thus, the UE's PCC would typically function as an anchor for control signaling between the base station and the UE and as the carrier that is at issue for handover measurements. For instance, for scheduling data communications on the UE's PCC and SCC(s), the base station may transmit scheduling directives to the UE on the UE's PCC. Further, as the UE is served with carrier-aggregation, the UE may regularly evaluate coverage strength from its serving base station on the UE's PCC and perhaps coverage strength from one or more adjacent base stations, and when the UE detects that coverage from an adjacent base station is threshold stronger than coverage from the serving base station on the UE's PCC, the UE may report that fact to the serving base station, and the serving base station may accordingly process handover of the UE.

Optimally when a UE is handing over from one base station (source base station) to another (target base station), the UE should not have to hand over from one carrier to another. For instance, if the UE is connected with the source base station on a particular carrier and is going to hand over to a target base station, it may be desirable for the UE to be served by the target base station on that same carrier. Maintaining continuity of the UE's serving carrier as the UE hands over from a source base station to a target base station may help to ensure (or increase likelihood of) success of the handover, by avoiding or minimizing connectivity issues and RRC-signaling issues that might arise from the UE having to tune from one carrier to another in the process.

Disclosed herein is a method and system that may help to address this issue.

The disclosure addresses a scenario where a first base station is serving a UE with carrier-aggregation on a combination of carriers that includes a first carrier and a second carrier, with the first carrier being a PCC of the carrier-aggregation service and the second carrier being one of one or more SCCs of the carrier-aggregation service. According to the disclosure, in that scenario, the first base station will predict that the UE will hand over from being connected with the first base station to being connected with an adjacent second base station on the second carrier. And in response to this prediction, the first base station will then reconfigure the UE's carrier aggregation service by swapping the UE's PCC and SCC—namely, by changing the UE's RRC connection from having the first carrier be the UE's PCC and the second carrier be one of the UE's one or more SCCs to having the second carrier be the UE's PCC and the first carrier be one of the UE's one or more SCCs.

By so reconfiguring the UE's carrier aggregation service to make the second carrier replace the first carrier as the UE's PCC, the first base station can help increase the likelihood of success of the predicted handover of the UE to the adjacent base station, by enabling the UE to hand over from being primarily connected by with the first base station on the second carrier to being connected with the adjacent base station on the same second carrier. And by merely swapping carriers on which the UE is currently served, the base station can maintain continuity of the set of carriers on which the base station serves the UE until the handover occurs, even though a different one of those carriers will be the UE's PCC.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a network that includes cell sites supporting both 4G LTE (4G) and 5G NR (5G) and dual-connectivity service on 4G and 5G, and where 4G supports carrier aggregation, but where adjacent cell sites employ different 4G carriers or different sets of 4G carriers than each other. It should be understood, however, that the principles disclosed herein could extend to apply with respect to other scenarios as well, such as with respect to other radio access technologies. Further, it should be understood that other variations from the specific arrangements and processes described are possible. For instance, various described entities, connections, functions, and other elements could be added, omitted, distributed, re-located, re-ordered, combined, or changed in other ways.

Figure 1:
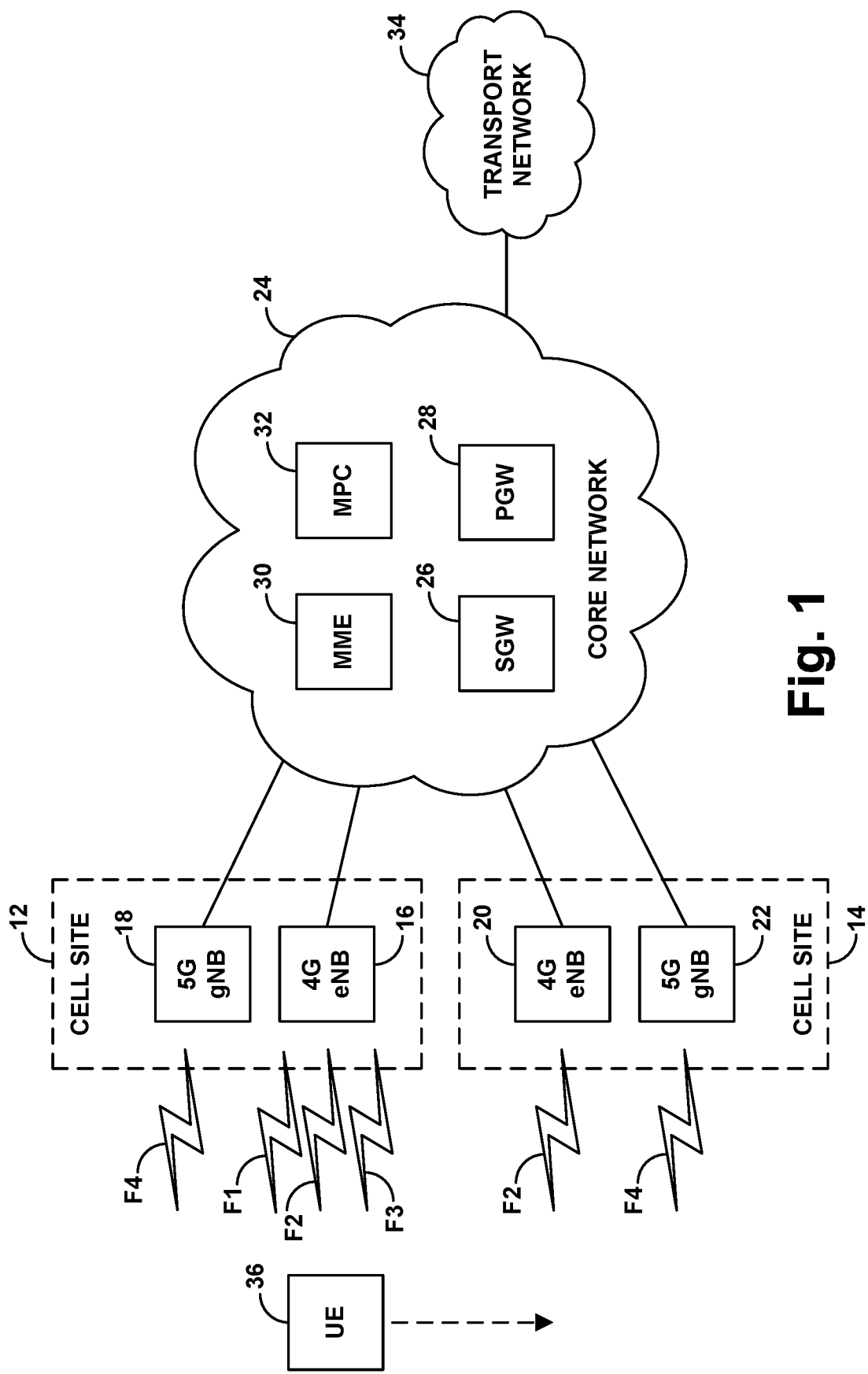
FIG. 1 is a simplified block diagram of an example network arrangement in which features of the present disclosure can be implemented.

FIG. 1 depicts an example network including two example cell sites 12, 14, each including a 4G base station (4G evolved-Node-B (eNB)) and a 5G base station (5G next generation Node-B (gNB)). In particular, cell site 12 includes a 4G eNB 16 and a 5G gNB 18, and cell site 14 includes a 4G eNB 20 and a 5G gNB 22. Further, in the example arrangement as shown, in cell site 12, 4G eNB 16 is configured to provide service on each of three representative carriers, F1, F2, and F3, and 5G gNB 18 is configured to provide service on a representative carrier F4. Whereas, in cell site 14, 4G eNB 20 is configured to provide service on just carrier F2 (and not on carrier F1), and 5G gNB 22 is configured to provide service on carrier F4.

At each of these cell sites, the 4G eNB and 5G gNB could be collocated with each other, perhaps sharing a common antenna tower and other equipment, and providing overlapping coverage with each other so that UEs could be positioned concurrently in coverage of the cell site's 4G eNB and the cell site's 5G gNB. And each eNB and gNB could take any of various forms, such as a macro base station, a small cell or femto base station, a relay, or the like. Further, service that a 4G eNB provides on each of one or more carriers could differ from service that a 5G gNB provides on each of one or more carriers in various ways now known or later developed, such as with one implementing variable subcarrier spacing and the other having fixed subcarrier spacing, with one having flexible TDD configuration and the other having fixed TDD configuration, with one having different symbol time segments than the other, and/or with one making different use of MIMO technologies than the other, among other possibilities.

In representative 4G and 5G implementations, each carrier could be FDD or TDD and could thus define separate downlink and uplink frequency channels or a single frequency channel multiplexed over time between downlink and uplink use. In any event, each frequency channel of a carrier could be characterized by a defined frequency bandwidth (width in RF spectrum) and center frequency and may have a unique carrier identifier.

Coverage provided by a 4G or 5G base station on a given carrier could be divided over time into frames, subframes, timeslots, and symbol time segments, and over frequency into subcarriers, thus defining an array of air-interface resource elements in which subcarriers can be modulated to carry data. Further, in each subframe, timeslot, or the like, the resource elements could be divided into groups defining physical resource blocks (PRBs), which the base station could allocate for use to carry data to or from served UEs.

As further shown, the example 4G and 5G base stations are each connected with a common core network 24, such as an Evolved Packet Core (EPC) network or Next Generation Core (NGC) network. In the example shown, the core network includes a serving gateway (SGW) 26, a packet data network gateway (PGW) 28, a mobility management entity (MME) 30, and a mobile positioning center (MPC) 32, although other configurations are possible.

In practice, each 4G eNB may have an interface with the SGW, the SGW may have an interface with the PGW, and the PGW may provide connectivity with a transport network 34. Further, each 4G eNB may have an interface with the MME, and the MME may have an interface with the SGW, so that the MME could coordinate setup of bearer connections for a UE to enable the UE to engage in packet-data communication via the 4G eNB.

Likewise, each 5G gNB may have an interface with the SGW and MME, and the MME may have its interface with the SGW, so that the MME could coordinate setup of bearer connections for a UE to enable the UE to engage in packet-data communication via the 5G gNB. Alternatively, the 5G gNB of each cell site may operate as a secondary node with the 4G eNB of the cell site operating as a master node for dual-connectivity service, in which case the cell site's 4G eNB may be the anchor for signaling with the MME in relation to the dual-connectivity service.

FIG. 1 further depicts an example UE 36 that is within coverage of the base stations of cell site 12 and may be served by cell site 12 but may be moving toward coverage of cell site 14. In an example implementation (not shown), UE 36 is configured with a 4G radio and associated components to establish a 4G connection with a 4G eNB and to be served according to 4G over that connection and a 5G radio and associated components to establish a 5G connection with a 5G gNB and to be served according to 5G over that connection.

When UE 36 initially enters into coverage of 4G eNB 16, the UE may detect threshold strong coverage of the 4G eNB 16 on carrier F1, and the UE may therefore engage in signaling with the 4G eNB 16 to establish a 4G RRC connection with the 4G eNB 16 on carrier F1. In addition, if the UE is not yet attached, the UE could then engage in attach signaling with the MME via the UE's 4G connection with the 4G eNB 16, and the MME could set up one or more bearers for the UE, with the 4G eNB 16 setting up corresponding data radio bearers for the UE, to enable the UE to engage in packet-data communication over the UE's 4G connection with the 4G eNB 16.

Further, the 4G eNB 16 could establish for the UE a context record and could store in the UE context record various connection, service, and capabilities data for the UE. For instance, the 4G eNB 16 could store in the context record an identifier of the UE's established 4G connection and an identifier of carrier F1 on which the UE is connected with the 4G eNB 16 And the 4G eNB 16 could obtain and store in the UE context record an indication that the UE supports 4G-5G dual connectivity service (e.g., EUTRA-NR Dual Connectivity (EN-DC) service).

Once the UE is connected with the 4G eNB 16 on carrier F1, the 4G eNB 16 could serve the UE as discussed above. In particular, when the 4G eNB 16 receives packet-data for transmission to the UE, the 4G eNB 16 could select downlink PRBs on carrier F1 to carry the data to the UE, and the 4G eNB 16 could schedule and provide transmission of the data to the UE on those PRBs. And when the UE has packet-data for transmission to the 4G eNB 16, the 4G eNB 16 could select uplink PRBs on carrier F1 to carry the data from the UE and could schedule that transmission, and the UE could accordingly transmit the data to the 4G eNB 16 on those PRBs.

Further, once the UE is connected with the 4G eNB 16 on carrier F1 (or perhaps at the time of setting up that connection), the 4G eNB 16 could also set up carrier-aggregation service for the UE. To do so, the 4G eNB 16 might direct the UE to scan for coverage of the 4G eNB 16 on the other carriers F2, F3 on which the 4G eNB 16 is configured to provide service and may receive from the UE a responsive report that the UE detected threshold strong coverage on at least carrier F2. In response, the 4G eNB 16 could then transmit to the UE an RRC connection-reconfiguration message that indicates that the 4G eNB 16 will now serve the UE on a combination of carriers F1 and F2, with carrier F1 being the UE's PCC and carrier F2 being the UE's SCC (perhaps one of one or more SCCs). In a representative implementation, the 4G eNB 16 could specify the PCC versus SCC nature of each carrier by index values in the RRC message, such as by designating carrier F1 by index 0 (zero) to indicate that it is the UE's PCC and by designating carrier F2 by index 1 (one) to indicate that it is the UE's SCC. And the 4G eNB and UE could update their records accordingly to indicate that the UE is now being served with carrier aggregation so configured on carriers F1 and F2.

In line with the discussion above, with this carrier-aggregation service, the UE would be primarily connected on carrier F1, with carrier F2 being added to increase the bandwidth available for carrying data communications (perhaps on the downlink specifically). Thus, when the 4G eNB 16 receives data for transmission to the UE, the 4G eNB could allocate PRBs on carriers F1 and F2, could transmit to the UE on carrier F1 a scheduling directive specifying those allocated PRBs, and could accordingly transmit the data to the UE in the allocated PRBs.

Still further, the 4G eNB 16 could coordinate setup of 4G-5G dual-connectivity service (e.g., EN-DC service) for the UE. To do so, the 4G eNB 16 could direct the UE to scan for coverage on one or more 5G carriers, and the UE could responsively report to the 4G eNB 16 that the UE detects coverage of 5G gNB 18 on 5G carrier F4. Given this, the 4G eNB 16 could then engage in inter-base-station signaling with the 5G gNB 18 to arrange for setup of a 5G RRC connection on the 5G carrier F4 between the 5G gNB 18 and the UE, and the 4G eNB 16 could further coordinate or engage in signaling with the MME to trigger setup for the UE of a split bearer, so that the UE's packet-data communication can then be multiplexed between the UE's 4G connection and the UE's 5G connection.

With dual-connectivity service so set up, when the core network had packet-data to transmit to the UE, a portion of the data may flow to ultimately the 4G eNB 16, and the 4G eNB 16 may schedule and provide transmission of that portion of the data over the UE's 4G connection to the UE, and another portion of the data may flow ultimately to 5G gNB 18, and the 5G gNB 18 may schedule and provide transmission of that other portion of the data over the UE's 5G connection to the UE. And when the UE has data to transmit, the 4G eNB 16 may schedule transmission of a portion of the data over the UE's 4G connection to the 4G eNB 16 and the UE may accordingly engage in that transmission, and the 5G gNB 18 may schedule transmission of another portion of that data over the UE's 5G connection to the 5G gNB 18, and the UE may accordingly engage in that transmission.

When the UE is served by the 4G eNB 16 with carrier F1 as its PCC, the UE may regularly monitor coverage strength from the 4G eNB 16 on carrier F1 a noted above and may also monitor 4G coverage strength from adjacent cell sites, such as coverage strength from 4G eNB 20 of cell site 14 on carrier F2, and the UE may provide measurement reports to its serving 4G eNB 16 to enable the 4G eNB 16 to make handover decisions when appropriate.

In an example implementation for monitoring 4G coverage, the UE might be provisioned to monitor coverage strength of just its serving 4G eNB 14 on its PCC and to report to its serving 4G eNB 16 when that coverage strength becomes threshold low, at which point the 4G eNB 14 may then direct the UE to scan for and report neighboring base-station coverage strength on one or more carriers, including for instance coverage strength of neighboring 4G eNB 20 on carrier F2. Alternatively, the UE may regularly monitor and report both coverage strength of its serving 4G eNB 16 on carrier F1 and neighboring coverage strength on one or more carriers. The UE's serving 4G eNB 16 could thereby determine when handover of the UE from being connected with 4G eNB 16 on carrier F1 to being connected with 4G eNB 20 on carrier F2 is or will be appropriate.

To process handover of the UE from being connected with 4G eNB 16 on carrier F1 to being connected with 4G eNB 20 on carrier F2, 4G eNB 16 could initially engage in inter-base-station handover signaling with 4G eNB 20 (e.g., via core network 24) to prepare 4G eNB 20 to serve the UE on carrier F2, such as to transfer certain of the UE's RRC connection settings from 4G eNB 16 to 4G eNB 20. Further, the 4G eNB 16 could then send the UE an RRC connection-reconfiguration message that directs the UE to transition from being connected with 4G eNB 16 on carrier F1 to being connected instead with 4G eNB 20 on carrier F2, and the UE may accordingly switch from being tuned to carrier F1 and connected with 4G eNB 16 to being tuned to carrier F2 and connected with 4G eNB 20. In addition, 4G eNB 20 could engage in signaling with MME 30 to arrange for transfer of the UE's bearer(s) from being anchored at 4G eNB 16 to being anchored instead at 4G eNB 20. And 4G eNB 20 could then proceed to serve the UE on carrier F2.

Further, if the UE was served with dual-connectivity by cell site 12, this handover process could further involve 4G eNB 16 engaging in signaling to release the UE's 5G connection with 5G gNB 18 and associated bearer split, and upon transition of the UE to be served by 4G eNB 20, 4G eNB 20 then engaging in signaling to set up for the UE a new 5G connection with 5G gNB 22 and an associated bearer split.

With or without involvement of dual-connectivity, a technical complexity of the handover process described so far is that it involves the UE switching the carrier on which the UE is connected. Namely, the UE switches from being connected (with 4G eNB 16) on carrier F1 to being connected (with 4G eNB 20) on carrier F2. As suggested above, having the UE engage in such an inter-frequency handover process could risk handover failure as a result of RRC-signaling discontinuity or other associated issues. Further, the risk could be magnified if the UE is being served with dual-connectivity and if the UE's 4G connection functions as a master connection for the dual-connectivity service. For instance, if the UE's inter-frequency handover fails, the UE could lose its dual-connectivity service as well, which could give rise to associated user-experience issues.

As noted above, in accordance with the present disclosure, the 4G eNB 16 could help to minimize or avoid this issue by reconfiguring the UE's carrier-aggregation service when the 4G eNB 16 determines that the UE is going to hand over from being connected with 4G eNB 16 on carrier F1 to being connected with 4G eNB 20 on carrier F2. Namely, upon predicting that the UE will hand over from being connected with 4G eNB 16 on carrier F1 to being connected with 4G eNB 20 on carrier F2, 4G eNB 16 could reconfigure the UE's carrier-aggregation service to swap carriers F1 and F2 so that carrier F2 switches from being the UE's SCC to being the UE's PCC and carrier F1 switches from being the UE's PCC to being the UE's SCC. When the UE then hands over from being connected with 4G eNB 16 to being connected with 4G eNB 20, the UE could thus optimally maintain continuity of service on carrier F2 rather than engaging in inter-frequency handover from carrier F1 to carrier F2.

When the 4G eNB 16 is serving the UE with carrier-aggregation on a combination of at least carrier F1 as PCC and carrier F2 as SCC, the 4G eNB 16 could predict in various ways that the UE is going to hand over from being connected with 4G eNB 16 to being connected with neighboring 4G eNB 20 on carrier F2.

By way of example, the 4G eNB 16 could make this prediction based on measurement reporting from the UE. For instance, the 4G eNB 16 could receive from the UE one or more measurement reports that indicate alone or cooperatively (e.g., as a sequence of changing measurements) that the UE's coverage strength from 4G eNB 16 on carrier F1 is getting weaker and the UE's coverage strength from 4G eNB 20 on carrier F2 is getting stronger. Alternatively or additionally, the 4G eNB 16 could determine from one or more such measurement reports that the UE is currently in a state where the UE should hand over from being connected with 4G eNB 16 to being connected with 4G eNB 20 on carrier F2. Other examples based on measurement reporting are possible as well.

Alternatively or additionally, the 4G eNB 16 could make this prediction based on geographic location tracking and/or speed of movement of the UE (if applicable) in a direction from coverage of the 4G eNB 16 to coverage of 4G eNB 20, along with eNB data that indicates 4G eNB 20 is configured to provide service on carrier F2 but not on carrier F1.

To facilitate this, the UE may include a satellite-based positioning (e.g., Global Positioning System) module and may regularly determine and report to 4G eNB 16 the UE's geographic location (e.g., latitude and longitude). And the 4G eNB 16 may track the UE's location over time to determine that the UE is on a trajectory from being in stronger coverage of 4G eNB 16 to being in stronger coverage of 4G eNB 20 and that the UE's non-zero speed of movement along that trajectory is greater than a defined threshold speed deemed sufficient to suggest that the UE may soon need to hand over from 4G eNB 16 to 4G eNB 20.

Further, the determination and tracking of the UE's location could involve geographic location determination by the 4G eNB 16 and/or by MPC 32. By way of example, the 4G eNB 16 might determine the UE's geographic location through use of an observed time difference of arrival (OT-DOA) process based on reports from the UE related to positioning reference signals broadcast by multiple base stations. Or the MPC 32 might provide the UE with satellite ephemeris data related to satellites in the sky over coverage of 4G eNB 16 and the UE may use that data as a basis to use signaling from those satellites to determine the UE's geographic location, which the UE could report to the 4G eNB 16.

Having predicted that the UE will hand over from being connected with 4G eNB 16 to being connected with 4G eNB 20, the 4G eNB 16 could further refer to eNB-neighbor data to determine that target 4G eNB 20 is configured to provide service on carrier F2 and not on carrier F1. This data could be pre-provisioned into 4G eNB 16 or otherwise accessible to 4G eNB 16 and might specify for each of one or more neighboring 4G eNBs, including 4G eNB 20, what one or more carriers the neighboring 4G eNB is configured to provide service on, thus indicating by exclusion that the neighboring 4G eNB is not configured to provide service on carriers other than the one or more specified. With this information, the 4G eNB 16 could thus predict that the predicted handover of the UE from 4G eNB 16 to 4G eNB 20 will be a handover from the UE being connected with 4G eNB 16 (on carrier F1) to being connected with 4G eNB 20 on carrier F2.

Once the 4G eNB 16 thus predicts that the UE will hand over from being connected with the 4G eNB 16 (on carrier F1) to being connected with the 4G eNB 20 on carrier F2, the 4G eNB 16 can then responsively engage in the reconfiguration of the UE's carrier-aggregation service as noted above. Optimally, the 4G eNB 16 would do this before the handover of the UE occurs (perhaps before the 4G eNB 16 begins handover signaling with the 4G eNB 20 for so handing over the UE), so that when the handover occurs, the UE could maintain continuity of its serving carrier F2 in the process.

Figure 2:
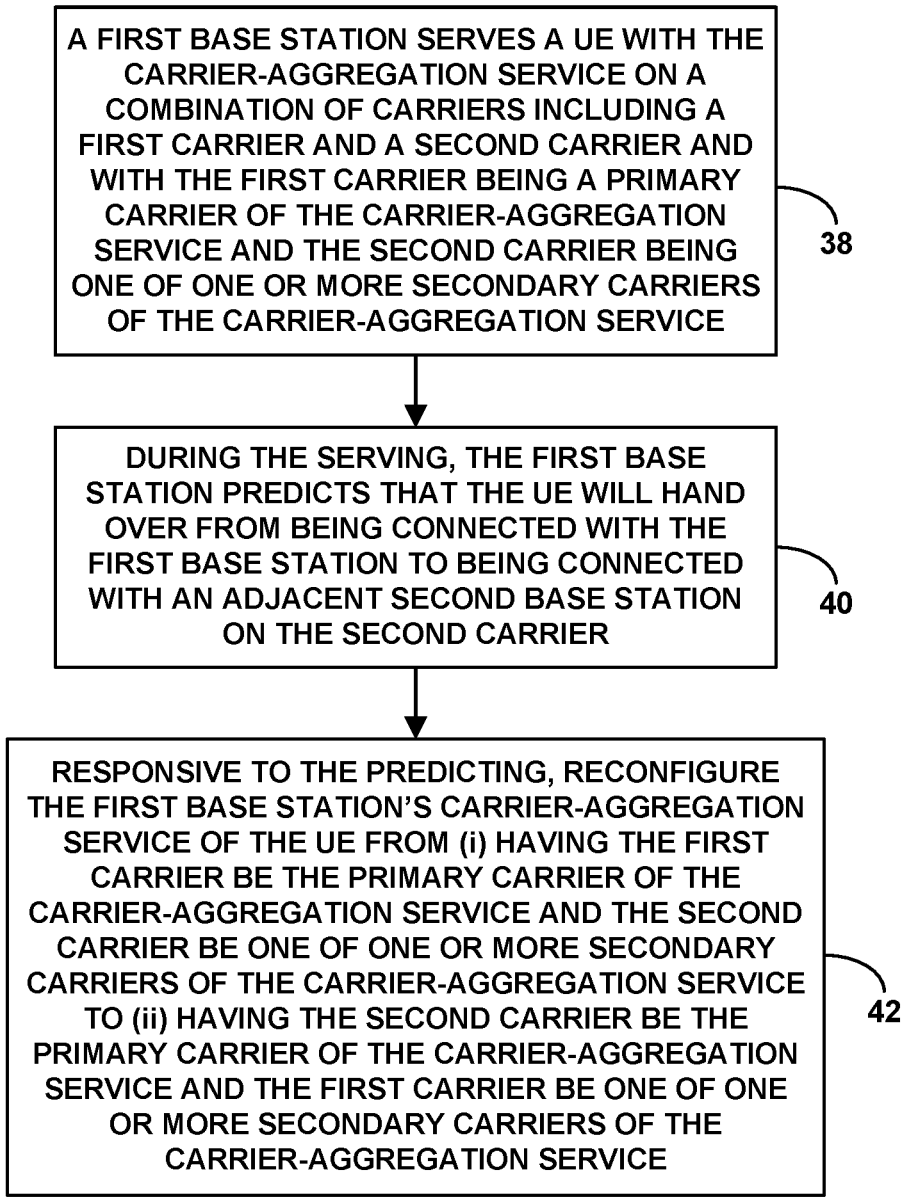
FIG. 2 is a flow chart depicting an example method in accordance with the present disclosure.

FIG. 2 is a flow chart depicting a method that can be carried out in accordance with the present disclosure to configure carrier-aggregation service of a UE when the UE is served by a first base station.

As shown in FIG. 2 at block 38, the method includes the first base station serving the UE with the carrier-aggregation service on a combination of carriers including a first carrier and a second carrier and with the first carrier being a primary carrier of the carrier-aggregation service and the second carrier being one of one or more secondary carriers of the carrier-aggregation service. Further, at block 40, the method includes, during the serving, the first base station predicting that the UE will hand over from being connected with the first base station to being connected with an adjacent second base station on the second carrier. And at block 42, the method includes, responsive to the predicting, reconfiguring the first base station's carrier-aggregation service of the UE from (i) having the first carrier be the primary carrier of the carrier-aggregation service and the second carrier be one of one or more secondary carriers of the carrier-aggregation service to (ii) having the second carrier be the primary carrier of the carrier-aggregation service and the first carrier be one of one or more secondary carriers of the carrier-aggregation service.

In line with the discussion above, in the carrier-aggregation service, the primary carrier could be an anchor carrier for control signaling between the first base station and the UE. And for scheduled data communication in the carrier-aggregation service, the primary carrier could carry both downlink and uplink communication between the first base station and the UE but each of the one or more secondary carriers could carry just downlink communication between the first base station and the UE.

Further, as noted above, the method could be carried out when the UE is served with dual connectivity by (i) the first base station according to a first RAT such as 4G LTE for example and (ii) a third base station according to a second RAT such as 5G NR for example.

As further discussed above, the act of the first base station predicting that the UE will hand over from being connected with the first base station to being connected with the second base station on the second carrier could be based on measurement reporting received by the first base station from the UE and/or could be based on tracking of geographic location of the UE. For example, the predicting could involve determining that a non-zero speed of movement of the UE in a direction from coverage of the first base station to coverage of the second base station is at least predefined threshold high.

Still further, as discussed above, the UE could have an RRC connection with the first base station, and the act of reconfiguring the first base station's carrier-aggregation service of the UE could include transmitting from the first base station to the UE an RRC connection-reconfiguration message that indexes the second carrier as the primary carrier of the carrier-aggregation service and that indexes the first carrier as one of the one or more secondary carriers of the carrier-aggregation service.

Figure 3:
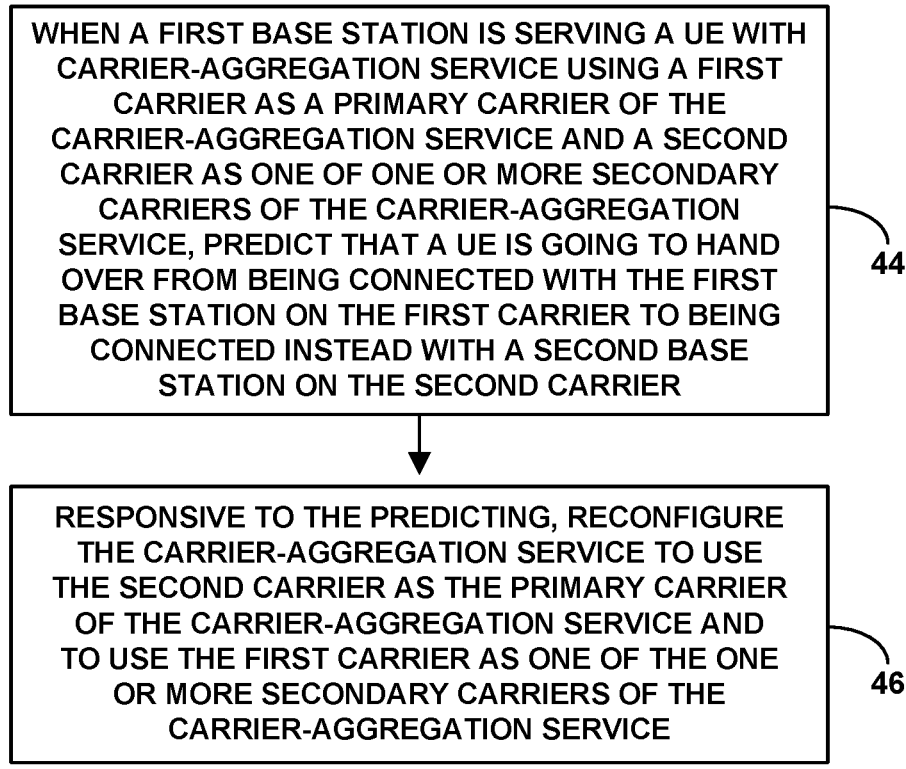
FIG. 3 is another flow chart depicting an example method in accordance with the present disclosure.

FIG. 3 is next a flow chart of a method for configuring service of a UE when the UE is served by a first base station with carrier-aggregation service using a first carrier as a primary carrier of the carrier-aggregation service and a second carrier as one of one or more secondary carriers of the carrier-aggregation service. This method could be carried out by or on behalf of the first base station and/or one or more other entities.

As shown in FIG. 3, at block 44, the method includes predicting that the UE is going to hand over from being connected with the first base station on the first carrier to being connected instead with a second base station on the second carrier. And at block 46, the method includes, responsive to the predicting, reconfiguring the carrier-aggregation service to use the second carrier as the primary carrier of the carrier-aggregation service and to use the first carrier as one of the one or more secondary carriers of the carrier-aggregation service.

Various features discussed above can be implemented in this context as well, and vice versa. For example, here too, the method could be carried out when the UE is served with dual connectivity by (i) the first base station according to a first RAT and (ii) a third base station according to a second RAT. Other examples are possible as well.

Figure 4:
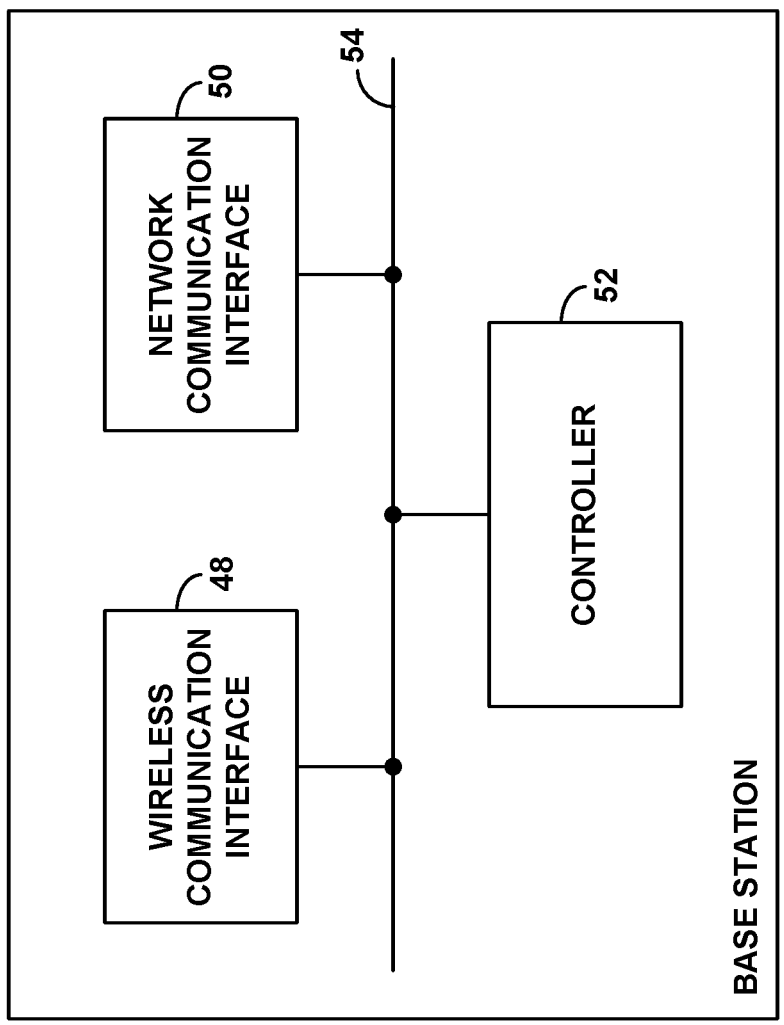
FIG. 4 is a simplified block diagram of an example base station operable in accordance with the present disclosure.

FIG. 4 is next a simplified block diagram depicting an example base station that could operate in accordance with the present disclosure, perhaps as 4G eNB 16. As shown, the example base station includes a wireless communication interface 48, a network communication interface 50, and a controller 52, all of which could be communicatively linked together by a system bus, network, or other connection mechanism 54.

The wireless communication interface 48 of the base station could comprise an antenna structure, which could be tower mounted or may could other forms, and associated components such as a power amplifier and a wireless transceiver, so as to facilitate providing coverage and service on each of multiple carriers such as carriers F1, F2, F3 as discussed above, with coverage on each carrier defining an air interface having a downlink and an uplink, and engaging in transmission and reception of bearer and control data over the air interface. And the network communication interface 50 could comprise a wired or wireless interface, such as an Ethernet network communication interface, configured to support communication with other entities, such as with other base stations or core-network entities.

Controller 52, which might be situated in a baseband unit of the base station if appropriate, could comprise a processing unit (e.g., one or more general purpose processors and/or specialized processors) programmed to cause the base station to carry out various operations as discussed above. Thus, here too, various features discussed above could be applied in this context as well, and vice versa.

Exemplary embodiments have been described above. Those skilled in the art will understand, however, that changes and modifications may be made to these embodiments without departing from the true scope and spirit of the invention.

We claim:

1. A method for configuring carrier-aggregation service of a user equipment device (UE) when the UE is served by a first base station, the method comprising:

serving by the first base station the UE with the carrier-aggregation service on an air-interface connection between the first base station and the UE, the air-interface connection being on a combination of carriers including a first carrier and a second carrier, and the first carrier being a primary carrier of the carrier-aggregation service and the second carrier being one of one or more secondary carriers of the carrier-aggregation service, wherein serving by the first base station the UE with the carrier-aggregation service on the air-interface connection that is on the combination of carriers including the first carrier and the second carrier involves the first base station transmitting data from the first base station to the UE on air-interface resources of the first carrier and on air-interface resources of the second carrier;

during the serving, predicting by the first base station that the UE will hand over from being connected with the first base station to being connected with an adjacent second base station on the second carrier; and responsive to the predicting, and before the predicted handover occurs, reconfiguring the first base station's carrier-aggregation service of the UE from (i) having the first carrier be the primary carrier of the carrier-aggregation service and the second carrier be one of one or more secondary carriers of the carrier-aggregation service to (ii) having the second carrier be the primary carrier of the carrier-aggregation service and the first carrier be one of one or more secondary carriers of the carrier-aggregation service.

2. The method of claim 1, wherein in the carrier-aggregation service, the primary carrier is an anchor carrier for control signaling between the first base station and the UE.

3. The method of claim 1, wherein for scheduled data communication in the carrier-aggregation service, the primary carrier carries both downlink and uplink communication between the first base station and the UE and each of the one or more secondary carriers carries just downlink communication between the first base station and the UE.

4. The method of claim 1, carried out when the UE is served with dual connectivity by (i) the first base station according to a first radio access technology and (ii) a third base station according to a second radio access technology.

5. The method of claim 4, wherein the first radio access technology is 4G LTE, and wherein the second radio access technology is 5G NR.

6. The method of claim 1, wherein predicting by the first base station that the UE will hand over from being connected with the first base station to being connected with the second base station on the second carrier is based on measurement reporting received by the first base station from the UE.

7. The method of claim 1, wherein predicting by the first base station that the UE will hand over from being connected with the first base station to being connected with the second base station on the second carrier is based on tracking of geographic location of the UE.

8. The method of claim 1, wherein predicting by the first base station that the UE will hand over from being connected with the first base station to being connected with the second base station on the second carrier comprises determining that a non-zero speed of movement of the UE in a direction from coverage of the first base station to coverage of the second base station is at least predefined threshold high.

9. The method of claim 1, wherein the UE has a Radio Resource Control (RRC) connection with the first base station, and wherein the reconfiguring of the first base station's carrier-aggregation service of the UE comprises:

transmitting from the first base station to the UE an RRC connection-reconfiguration message that indexes the second carrier as the primary carrier of the carrier-aggregation service and that indexes the first carrier as one of the one or more secondary carriers of the carrier-aggregation service.

10. A method for configuring service of a user equipment device (UE) when the UE is served by a first base station with carrier-aggregation service on an air-interface connection between the first base station and the UE, the air-interface connection being on a combination of carriers including a first carrier and a second carrier, and the first carrier being a primary carrier of the carrier-aggregation service and the second carrier being one of one or more secondary carriers of the carrier-aggregation service, wherein serving by the first base station the UE with the carrier-aggregation service on the air-interface connection that is on the combination of carriers including the first carrier and the second carrier involves the first base station transmitting data from the first base station to the UE on air-interface resources of the first carrier and on air-interface resources of the second carrier, the method comprising:

predicting that the UE is going to hand over from being connected with the first base station on the first carrier to being connected instead with a second base station on the second carrier; and responsive to the predicting, and before the predicted handover occurs, reconfiguring the carrier-aggregation service to use the second carrier as the primary carrier of the carrier-aggregation service and to use the first carrier as one of the one or more secondary carriers of the carrier-aggregation service.

11. The method of claim 10, carried out when the UE is served with dual connectivity by (i) the first base station according to a first radio access technology and (ii) a third base station according to a second radio access technology.

12. A wireless communication system comprising:

a first base station configured to provide service on at least a first carrier and a second carrier;

a second base station configured to provide service on the second carrier but not on the first carrier; and wherein the first base station includes a controller having a processing unit programmed to cause the first base station to carry out operations including:

serving a UE with carrier-aggregation service on an air-interface connection between the first base station and the UE, the air-interface connection being on a combination of the first carrier and the second carrier, and the first carrier being a primary carrier of the carrier-aggregation service and the second carrier being one of one or more secondary carriers of the carrier-aggregation service, wherein serving by the first base station the UE with the carrier-aggregation service on the air-interface connection that is on the combination of carriers including the first carrier and the second carrier involves the first base station transmitting data from the first base station to the UE on air-interface resources of the first carrier and on air-interface resources of the second carrier, during the serving, predicting that the UE will hand over from being connected with the first base station to being connected with the second base station on the second carrier, and responsive to the predicting and the determining, and before the predicted handover occurs, reconfiguring the carrier-aggregation service of the UE from (i) having the first carrier be the primary carrier of the carrier-aggregation service and the second carrier be one of one or more secondary carriers of the carrier-aggregation service to (ii) having the second carrier be the primary carrier of the carrier-aggregation service and the first carrier be one of one or more secondary carriers of the carrier-aggregation service.

13. The system of claim 12, wherein in the carrier-aggregation service, the primary carrier is an anchor carrier for control signaling between the first base station and the UE.

14. The system of claim 12, wherein for scheduled data communication in the carrier-aggregation service, the primary carrier carries both downlink and uplink communication between the first base station and the UE and each of the one or more secondary carriers carries just downlink communication between the first base station and the UE.

15. The system of claim 12, wherein the processing unit of the first base station carries out the operations when the UE is served with dual connectivity by (i) the first base station according to a first radio access technology and (ii) a third base station according to a second radio access technology.

16. The system of claim 15, wherein the first radio access technology is 4G LTE, and wherein the second radio access technology is 5G NR.

17. The system of claim 12, wherein predicting that the UE will hand over from being connected with the first base station to being connected with the second base station on the second carrier is based on measurement reporting received by the first base station from the UE.

18. The system of claim 12, wherein predicting that the UE will hand over from being connected with the first base station to being connected with the second base station on the second carrier is based on tracking of geographic location of the UE.

19. The system of claim 12, wherein predicting that the UE will hand over from being connected with the first base station to being connected with the second base station on the second carrier comprises determining that a non-zero speed of movement of the UE in a direction from coverage of the first base station to coverage of the second base station is at least predefined threshold high.

20. The system of claim 12, wherein reconfiguring of the first base station's carrier-aggregation service of the UE comprises:

transmitting from the first base station to the UE a Radio Resource Control (RRC) connection-reconfiguration message that indexes the second carrier as the primary carrier of the carrier-aggregation service and that indexes the first carrier as one of the one or more secondary carriers of the carrier-aggregation service.

* * * * *